(12) United States Patent
Maiti

(10) Patent No.: US 10,212,152 B2
(45) Date of Patent: Feb. 19, 2019

(54) ADVANCED APPLICATION SECURITY UTILIZING AN APPLICATION KEY

(71) Applicant: SugarCRM Inc., Cupertino, CA (US)

(72) Inventor: Anirban Maiti, Mountain View, CA (US)

(73) Assignee: SUGARCRM INC., Cupertino, CA (US)

( * ) Notice: Subject to any disclaimer, the term of this patent is extended or adjusted under 35 U.S.C. 154(b) by 124 days.

(21) Appl. No.: 15/159,071

(22) Filed: May 19, 2016

(65) Prior Publication Data

US 2017/0339127 A1 Nov. 23, 2017

(51) Int. Cl.
  *H04L 29/06* (2006.01)

(52) U.S. Cl.
  CPC ........... *H04L 63/083* (2013.01); *H04L 63/10* (2013.01); *H04L 2463/082* (2013.01)

(58) Field of Classification Search
  None
  See application file for complete search history.

(56) References Cited

U.S. PATENT DOCUMENTS

| | | | |
|---|---|---|---|
| 2004/0111644 A1* | 6/2004 | Saunders | G06F 21/41 726/8 |
| 2007/0016943 A1* | 1/2007 | M'Raihi | G06F 21/33 726/9 |
| 2011/0209208 A1* | 8/2011 | Quach | H04L 9/3215 726/7 |
| 2011/0277019 A1* | 11/2011 | Pritchard, Jr. | H04L 63/0815 726/4 |
| 2017/0169249 A1* | 6/2017 | de Oliveira | G06F 21/6245 |

* cited by examiner

*Primary Examiner* — Fatoumata Traore
(74) *Attorney, Agent, or Firm* — Steven M. Greenberg, Esq.; Shutts & Bowen LLP

(57) ABSTRACT

Embodiments of the invention provide a method, system and computer program product for advanced application authentication utilizing an application key. In a method of the invention, an end user provides in a single user interface screen for authenticating into an application, each of a user identification, password and an application key. Thereafter, the application key is validated in connection with the user identification. If the application key validates in connection with the user identification, one or more application parameters for the application necessary to complete a log-in process are retrieved and the end user is authenticated into the application utilizing each of the user identification, password and application parameters so as to complete the log in process for the end user and the application and the end user is granted the ability to utilize the application.

18 Claims, 2 Drawing Sheets

ADVANCED APPLICATION SECURITY UTILIZING AN APPLICATION KEY

BACKGROUND OF THE INVENTION

Field of the Invention

The present invention relates to application authentication.

Description of the Related Art

Authentication refers to the testing of an identity of an end user of an application to ensure proper authorization of the end user to access the application. Traditional methods of performing application authentication include general password authentication in which an end user submits in response to a prompt a predetermined password in order to gain access to the device. More advanced forms of password authentication involve the submission of any combination of a user identifier, private key or passphrase in addition to one or more answers to one or more corresponding challenge questions. Even more advanced modes of application authentication involve biometric analysis in which the fingerprint, voice print or iris scan of an end user can be compared to a pre-stored print in order to assure the authorized access of a submitting end user.

The integrity of the authentication process is largely dependent upon the ability of the end user to maintain the confidentiality of the identification and password of the end user. The loss of a password in many cases permits an unauthorized individual to successfully authenticate into an application. In consideration of the possibility of a breach of a simplistic authentication scheme, modern authentication schemes provide additional layers of protection. Those additional layers include requiring additional information from the end user, sensing when an authentication attempt occurs from an unfamiliar device and requiring the additional information, or requiring the provision of specific parameters requisite to the proper authentication of an end user into the application including the network addressing of a particular server, or the specification of a port or domain through which the end user accesses the application.

Requiring an enhanced authentication scheme, though, is not without its drawbacks. In particular, requiring the end user to remember multiple different parameters, passwords and identifiers is burdensome upon the end user and the end user often is at risk of simply forgetting critical information necessary to successfully authenticate into the application. As well, providing a multiplicity of prompts to the end user during authentication can be an irritant to the end user and can dissuade the end user from using the application in the first instance. Thus, an enhanced albeit non-burdensome authentication scheme would be desirable.

BRIEF SUMMARY OF THE INVENTION

Embodiments of the present invention address deficiencies of the art in respect to application authentication and provide a novel and non-obvious method, system and computer program product for advanced application authentication utilizing an application key. In an embodiment of the invention, a method for advanced application authentication utilizing an application key includes receiving from an end user of an application executing in memory of a computer in a single authentication user interface for the application, each of a user identification, a password and a separate application key and validating the application key in respect to the end user. Thereafter, in response to the validation of the application key in respect to the user identification, in connection with the application key one or more application parameters necessary to complete a log-in process for the application and to grant use of the application by the end user are retrieved, and the end user is authenticated into the application utilizing the user identification, password and the application parameters so as to complete the log-in process thereby granting use of the application by the end user.

In one aspect of the embodiment, the log-in parameters include at least a server address at which the application is accessed. In another aspect of the embodiment, the log-in parameters additionally include a port at which the application is accessed. In yet another aspect of the embodiment, the log-in parameters include a state configuration value for an initial state of the application presented when the end user is granted use of the application. Optionally, the application key is a numerical set of digits; however, in the alternative the application may be a token disposed in a file in an end user computing device of the end user.

In another embodiment of the invention, a data processing system is configured for advanced application authentication utilizing an application key. The system includes a host computing platform including one or more computers each with memory and at least one processor. An application is disposed in fixed storage of the host computing platform and an advanced application authentication module that includes program code executing in the memory of the host computing platform is provided. The program code is enabled to receive from an end user of the application in a single authentication user interface for the application, each of a user identification, a password and a separate application key, to validate the application key in respect to the end user, and to respond to the validation of the application key in respect to the user identification by retrieving in connection with the application key one or more application parameters necessary to complete a log-in process for the application and to grant use of the application by the end user, and authenticating the end user into the application utilizing the user identification, password and the retrieved application parameters so as to complete the log-in process for the application thereby granting use of the application by the end user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for advanced application authentication utilizing an application key. In accordance with an embodiment of the invention an end user provides in a single user interface screen for authenticating into an application, each of a user identification, password and an application key. Thereafter, the application key is validated in connection with the user identification. If the application key validates in connection with the user identification, one or more application parameters for the application necessary to complete a log-in process are retrieved and the end user is authenticated into the application utilizing each of the user identification, password and application parameters so as to complete the log in process for the end user and the application and the end user is granted the ability to utilize the application. In this way, a more secure mode of authentication is provided without requiring the end user to maintain an awareness of the complex parameters necessary to successfully authenticate and utilize the application.

Figure 1:
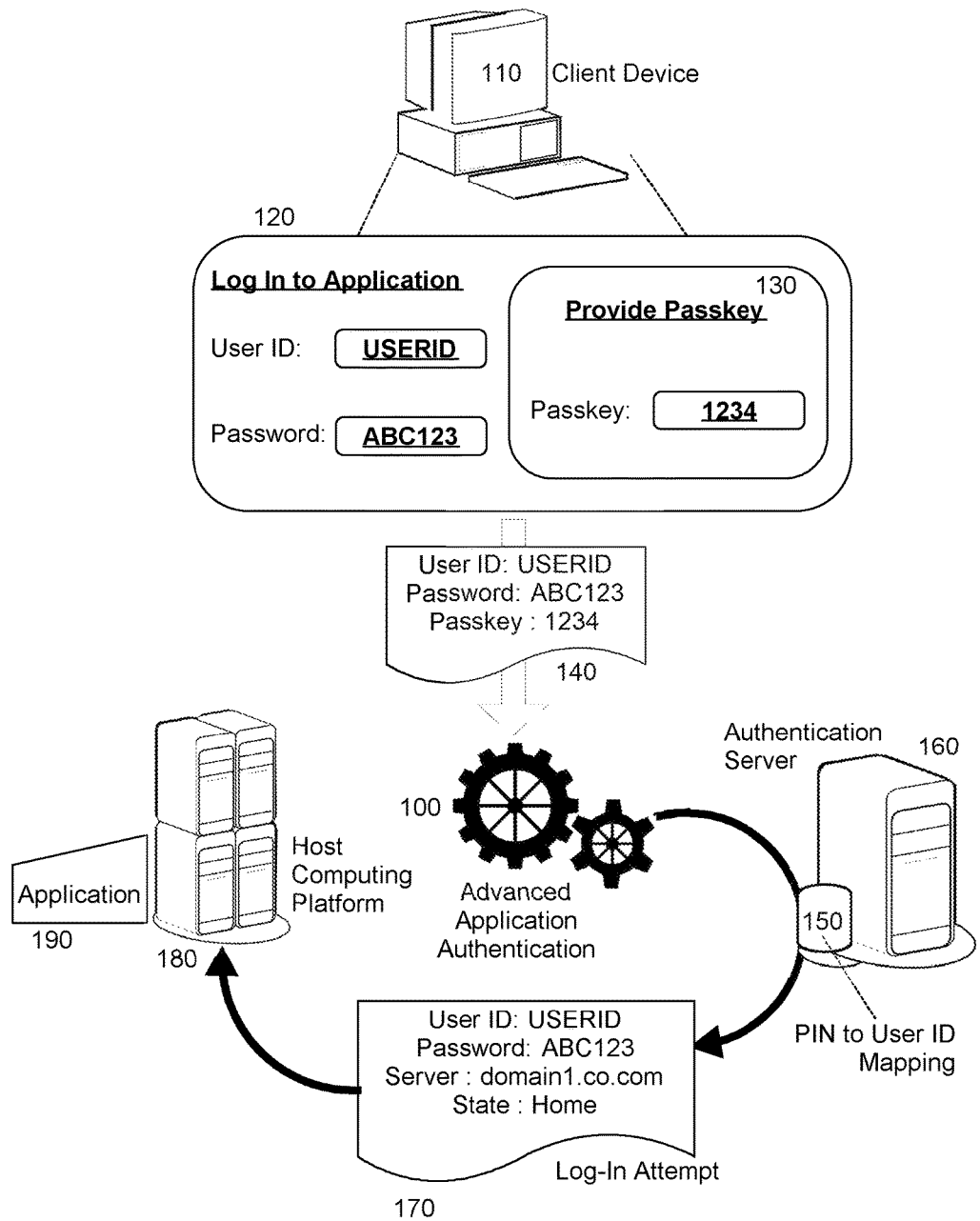
FIG. 1 is a pictorial illustration of a process for advanced application authentication utilizing an application key.

In further illustration, FIG. 1 pictorially shows a process for advanced application authentication utilizing an application key. As shown in FIG. 1, an end user through client device 110, such as a personal computer, mobile computing device or smart phone, requests a log-in to an application 190 executing in the memory of a host computing platform and accessible at a particular network address. In response, an authentication server 160, which may be supported by, or separate from the host computing platform 180, presents a single log-in user interface 120 to the end user in the client device 110 through which both log-in credentials 140 including a user identification and a password, and also a passkey 130 are received. The application passkey 130, by way of two examples, may be a sequence of digits as in a personal identification number (PIN), or the application passkey 130 may be token stored as a file in the client device 110.

Advanced application authentication logic 100 also executing in either the host computing platform 180 or in the authentication server 160 processes the application passkey 130 in order to validate the application passkey 130 in connection with the user identification in a mapping of passkeys to user identifications 150. If valid, the advanced application authentication logic 100 retrieves log-in parameters for the end user corresponding to the application passkey 130 in the mapping 150. Subsequently, the log-in credentials 140 along with the retrieved log-in parameters are included in a log-in attempt 170 to the application 190. Upon successful completion of the log-in attempt 170, the end user is then permitted to utilize the application 190 through the client device 110.

Figure 2:
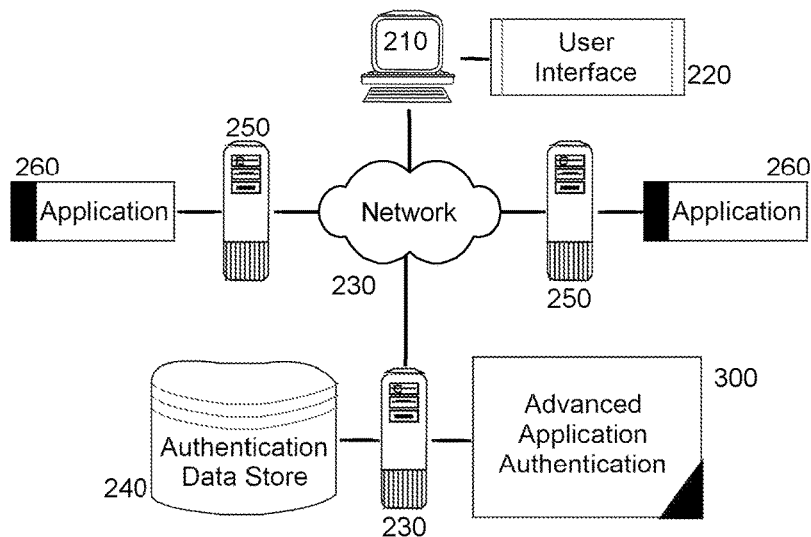
FIG. 2 is a schematic illustration of a data processing system configured for advanced application authentication utilizing an application key; and, FIG. 3 is a flow chart illustrating a process for advanced application authentication utilizing an application key.

The process described in connection with FIG. 1 is implemented in a data processing system. In yet further illustration, FIG. 2 schematic shows a data processing system configured for advanced application authentication utilizing an application key. The system includes a host computing platform 230 with one or more computers each with memory and at least one processor (only a single computing device shown for ease of illustration). A client device 210 is coupled to the host computing platform 230 over computer communications network 270. The client device 210 presents a user interface 220 through which an end user interacts with an instance 260 of an application 260 executing in a corresponding server 250.

Of note, an advanced application authentication module 300 is supported by the host computing platform 230 and is coupled to an authentication data store 240 storing user identification and password combinations as well as application passcode keys and corresponding log-in parameters. The advanced application authentication module 300 includes program code enabled upon execution in the memory of the host computing system 230 to receive through end user through user interface 220 each of a user identification and password combination for the end user along with an application passkey. The advanced application authentication module 300 validates the application passkey in connection with the user identification, and if valid retrieves one or more log-in parameters stored in association with the application pass key, including by way of example, a network address of a specified one of the instances 260 of the application in a respective one of the servers 250.

Thereafter, the program code of the advanced application authentication module 300 submits for authentication to the specified one of the instances 260 of the application in the respective one of the servers 250, the user identification and password, as well as the log-in parameters. As such, upon successful completion of the log-in process, the end user is then permitted to utilize the specified one of the instances 260 of the application.

Figure 3:
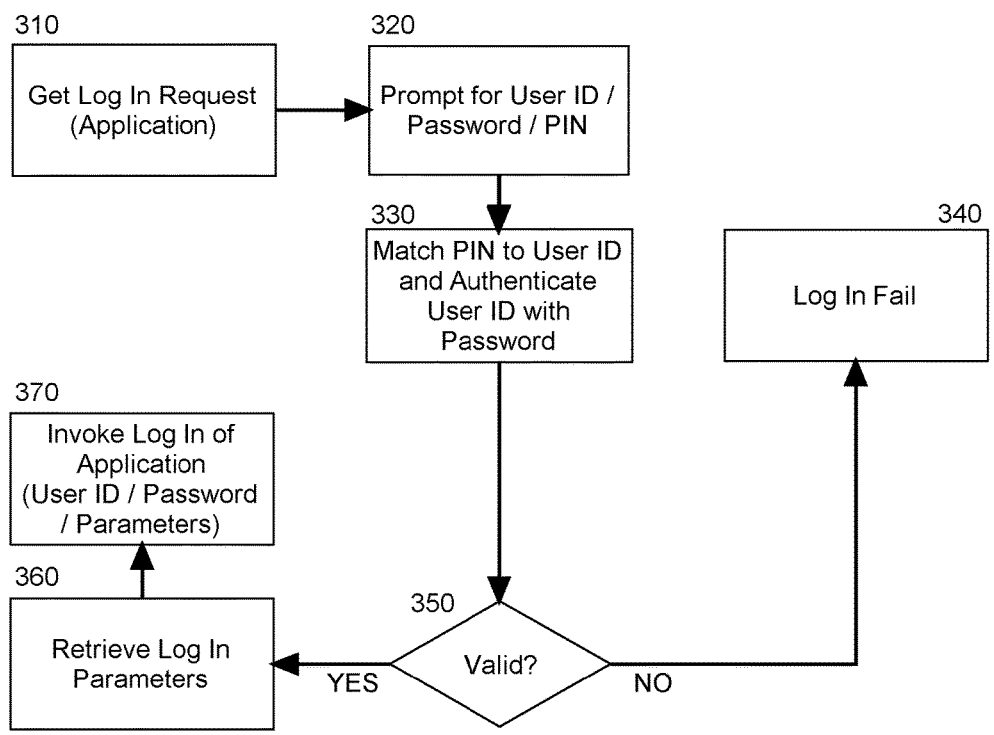

In even yet further illustration of the operation of the advanced application authentication module 300, FIG. 3 is a flow chart illustrating a process for advanced application authentication utilizing an application key. Beginning in block 310, a log in request for an application is received and in block 320, in response to the request, a prompt is presented for a user identification and password combination and also an application passkey. Subsequently, in block 330, the application passkey is matched with the user identification and in decision block 350, it is determined if the application passkey is valid. If not, the log in process is deemed to have failed in block 340. Otherwise, the process continues through block 360.

In block 360, one or more log in parameters are retrieved for the application passkey, including, for instance, a network address of a specified instance of the application and a desired initial state or view of the application. Thereafter, in block 380 a log in attempt is initiated in the specified instance of the application utilizing the received user identification and password combination as well as the retrieved log in parameters. Once the log in attempt has completed successfully, the end user is then permitted to utilize the specified instance of the application.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for advanced application authentication comprising:
   receiving from an end user of an application executing in memory of a computer in a single authentication user interface for the application, each of a user identification, a password and a separate application key wherein the separate application key comprises a network address of a specified one of the instances of the application;
   validating the application key in respect to the end user; and,
   responsive to the validation of the application key in respect to the user identification, retrieving in connection with the application key one or more application parameters necessary to complete a log-in process for the specified one of the instances of the application and to grant use of the specified one of the instances of the application by the end user, and authenticating the end user into the specified one of the instances of the application utilizing the user identification, password and retrieved application parameters so as to complete the log-in process for the specified one of the instances of the application there by granting use of the specified one of the instances of the application by the end user.

2. The method of claim 1, wherein the log-in parameters include at least a server address at which the application is accessed.

3. The method of claim 2, wherein the log-in parameters additionally include a port at which the application is accessed.

4. The method of claim 1, wherein the log-in parameters include a state configuration value for an initial state of the application presented when the end user is granted use of the application.

5. The method of claim 1, wherein the application key further comprises a numerical set of digits.

6. The method of claim 1, wherein the application key further comprises a token disposed in a file in an end user computing device of the end user.

7. A data processing system configured for advanced application authentication, the system comprising:
- a host computing platform comprising one or more computers each with memory and at least one processor;
- an application disposed in fixed storage of the host computing platform; and,
- an advanced application authentication module comprising program code executing in the memory of the host computing platform, the program code being enabled to receive from an end user of the application in a single authentication user interface for the application, each of a user identification, a password and a separate application key wherein the separate application key comprises a network address of a specified one of the instances of the application, to validate the application key in respect to the end user, and to respond to the validation of the application key in respect to the user identification by retrieving in connection with the application key one or more application parameters necessary to complete a log-in process for the specified one of the instances of the application and to grant use of the specified one of the instances of the application by the end user, and authenticating the end user into the specified one of the instances of the application utilizing the user identification, password and the retrieved application parameters so as to complete the log-in process for the specified one of the instances of the application there by granting use of the application by the end user.

8. The system of claim 7, wherein the log-in parameters include at least a server address at which the application is accessed.

9. The system of claim 8, wherein the log-in parameters additionally include a port at which the application is accessed.

10. The system of claim 7, wherein the log-in parameters include a state configuration value for an initial state of the application presented when the end user is granted use of the application.

11. The system of claim 7, wherein the application key further comprises a numerical set of digits.

12. The system of claim 7, wherein the application key further comprises a token disposed in a file in an end user computing device of the end user.

13. A computer program product for advanced application authentication, the computer program product comprising a non-transitory computer readable storage medium having program instructions embodied therewith, the program instructions executing by a device to cause the device to perform a method comprising:
- receiving from an end user of an application executing in memory of a computer in a single authentication user interface for the application, each of a user identification, a password and a separate application key wherein the separate application key comprises a network address of a specified one of the instances of the application;
- validating the application key in respect to the end user; and,
- responsive to the validation of the application key in respect to the user identification, retrieving in connection with the application key one or more application parameters necessary to complete a log-in process for the specified one of the instances of the application and to grant use of the specified one of the instances of the application by the end user, and authenticating the end user into the application utilizing the user identification, password and retrieved application parameters to the application so as to complete the log-in process for the specified one of the instances of the application there by granting use of the specified one of the instances of the application by the end user.

14. The computer program product of claim 13, wherein the log-in parameters include at least a server address at which the application is accessed.

15. The computer program product of claim 14, wherein the log-in parameters additionally include a port at which the application is accessed.

16. The computer program product of claim 13, wherein the log-in parameters include a state configuration value for an initial state of the application presented when the end user is granted use of the application.

17. The computer program product of claim 13, wherein the application key further comprises a numerical set of digits.

18. The computer program product of claim 13, wherein the application key further comprises a token disposed in a file in an end user computing device of the end user.

* * * * *